July 26, 1927.                E. D. CHURCH                1,637,175
                          FEED DEVICE FOR JOINTERS
                            Filed July 17, 1925
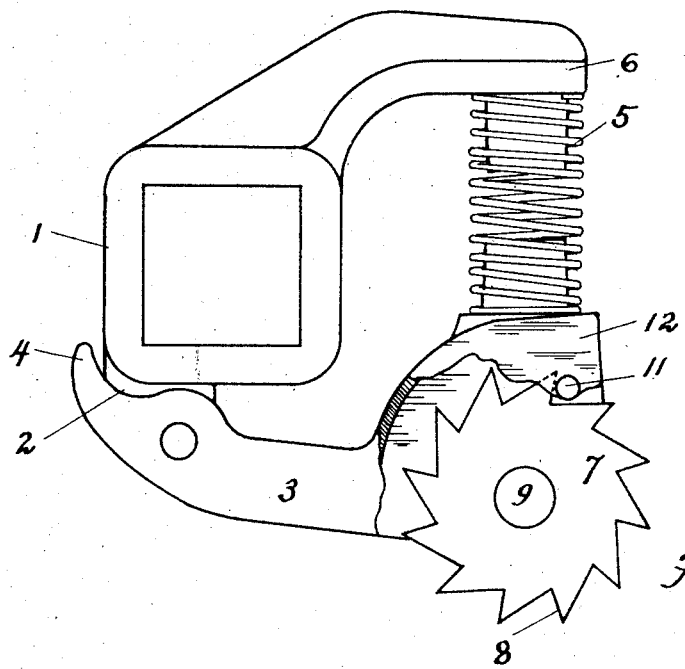
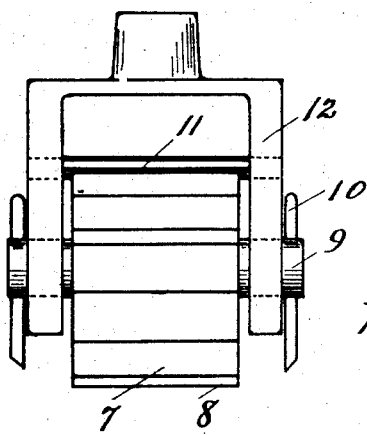

Patented July 26, 1927.

1,637,175

UNITED STATES PATENT OFFICE.

EDGAR D. CHURCH, OF SAGINAW, MICHIGAN, ASSIGNOR TO JACKSON & CHURCH COMPANY OF SAGINAW, MICHIGAN, A CORPORATION OF MICHIGAN.

FEED DEVICE FOR JOINTERS.

Application filed July 17, 1925. Serial No. 44,320.

This invention relates to wood planing machines known as finger jointers, having automatic mechanism for feeding boards to revolvable cutters. The work in such machines is fed with slight pressure applied to its surface by means of spring-pressed fingers, but not sufficient to bend or spring the board from its natural shape, so that when completed the planed surface will be perfectly straight.

A finger jointer of this kind is shown and described in patent to John Herzog, No. 919,351, issued April 27, 1909. In the machine of that patent there is a bed and a rotary cutter projecting through the bed, and above is an endless work-carrier comprising a series of cross bars. A number of fingers yieldable toward and from the bed are arranged lengthwise of each bar. The fingers are arranged to conform to the lateral and longitudinal contours of the work. In that patent, each finger is shown as a sharpened pin, vertically slidable in the horizontal cross bar and yieldably pressed down by a spring. The pressure exerted by these springs, as previously stated, is only sufficient to lightly engage the points of the individual fingers with the upper surface of the board, without springing the board. The plurality of fingers simultaneously engaged with the board together exert sufficient driving force to feed the work along the bed of the jointer. If, however, after continued use, the sharpened ends become dulled so that they do not properly engage the board, slipping ensues and the finished work becomes less accurate.

In the device of the patent the ends of the fingers can be sharpened only by removing them and dressing their points individually. That entails considerable work and loss of time because the machine must be shut down until the change is completed.

It is an object of my present improvement to provide means for quick replacement of the points that become dulled. To attain that object I preferably employ a socket having a spring-pressed finger provided with a plurality of work-engaging teeth, each tooth adapted to be easily and quickly moved into operative position and there locked. Any dulled tooth can be replaced by another sharpened tooth whenever desired without removing either the spring-pressed finger or the tooth from the machine.

My invention has means for the quick removal of all the teeth and replacing them with an entirely new group of teeth, the replacing of the whole series of teeth on a finger requiring no more time or labor than heretofore has been required for the renewal of a single tooth in the machine of the patent referred to.

Means for locking any one tooth to the finger in working position and for quickly unlocking when it is desired to substitute a new tooth is also provided by my improvement.

Since the present invention is an improvement on the tooth structure disclosed in Patent No. 919,351, and as I make no claim to the other features there disclosed, I shall here illustrate and describe only my improved tooth construction.

With the foregoing and certain other objects in view, which will appear later in the specifications, my invention consists in the devices described and claimed and the equivalents thereof.

Referring to the drawings, Fig. 1 is a side view of a socket carrying a yieldable finger which embodies my improvement.

Fig. 2 is a front view.

As is clearly shown in the drawings, the device consists in a socket 1 having lugs 2, to which a finger 3 is pivoted. The rear end of the finger is provided with a shoulder 4 to engage a wall of the socket and prevent the finger dropping too low under the action of spring 5. The upper end of the spring bears against an overhanging arm 6 on the socket.

My improvement consists in mounting at the end of the finger 3 a circularly adjustable tooth-carrying member 7 which in its general shape resembles a milling cutter or a toothed roller. This tooth-carrying member can be turned upon its axis to bring its different teeth successively into position to engage the work. The tooth-carrying member is pivotally mounted on its journal pin 9. The pin has a cotter key 10 or equivalent releasable fastening device at its end, so that member 7 can be easily removed and replaced.

To hold the member 7 in any of its circularly adjusted positions I provide a removable pin 11 extending through the side wings 12 of the finger 3 and passing between two adjacent teeth 8, 8.

By removing pin 11 and turning member 7 until a new tooth 8 is brought into working position, then re-inserting the pin 11 between two teeth is all that is required to accomplish the desired change from a dulled tooth to a sharp one. The pin 11 constitutes a releasable means, carried by the finger, and adapted to engage the member 7 and normally prevent its rotating.

By the means above described I have produced an inexpensive, yet strong and durable yieldingly depressed finger for jointers of the class described, whereby a machine can be kept in continuous service for a great length of time without having to be shut down for the replacement of worn or dulled work-engaging points.

Having thus described my invention, what I claim and desire to secure by Letters Patent is:

1. In combination, a spring-pressed finger for finger-jointers, a circularly adjustable tooth-carrying member on said finger, and releasable means carried by said finger and adapted to engage said member to normally prevent rotation thereof, for the purposes set forth.

2. In combination, a spring-pressed finger for finger-jointers, a circularly adjustable toothed member journaled on said finger near the free end thereof, and a transverse pin removably inserted in said finger and adapted to be received between two teeth of said toothed member to normally prevent the rotation thereof.

3. In combination, a spring-pressed finger for finger-jointers, the work-engaging end of said finger having a circularly adjustable toothed member removably journaled thereon, and means adapted to engage teeth of said member to normally prevent rotation thereof, for the purposes set forth.

In testimony whereof, I affix my signature.

EDGAR D. CHURCH.